(12) United States Patent
Gomila et al.

(10) Patent No.: US 7,738,722 B2
(45) Date of Patent: Jun. 15, 2010

(54) TECHNIQUE FOR ADAPTIVE DE-BLOCKING OF BLOCK-BASED FILM GRAIN PATTERNS

(75) Inventors: Cristina Gomila, Princeton, NJ (US); Joan Llach, Princeton, NJ (US); Jeffrey Allen Cooper, Rocky Hill, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 772 days.

(21) Appl. No.: 11/252,177

(22) Filed: Oct. 17, 2005

(65) Prior Publication Data

US 2006/0140278 A1 Jun. 29, 2006

Related U.S. Application Data

(60) Provisional application No. 60/620,702, filed on Oct. 21, 2004.

(51) Int. Cl.
*G06K 9/40* (2006.01)
*G06K 9/36* (2006.01)
*G06K 9/00* (2006.01)
*H04N 5/217* (2006.01)
*H04N 5/228* (2006.01)
*H04N 1/00* (2006.01)
*H04N 1/413* (2006.01)
*H04N 1/41* (2006.01)
*H04N 1/32* (2006.01)

(52) U.S. Cl. .................. 382/254; 382/276; 382/275; 382/260; 382/261; 382/264; 382/268; 382/100; 382/266; 382/267; 382/269; 348/241; 348/222.1; 358/426.01; 358/426.02; 358/426.03; 358/426.04; 358/426.05; 358/426.11; 358/426.12; 358/426.13; 358/426.14; 358/426.15; 358/426.16

(58) Field of Classification Search .................. 382/254, 382/276; 375/240.25
See application file for complete search history.

(56) References Cited

U.S. PATENT DOCUMENTS 4,935,816 A 6/1990 Faber (Continued)

FOREIGN PATENT DOCUMENTS

EP 0622000 8/2000

(Continued)

OTHER PUBLICATIONS

Eric R Jeschke, Simulating Film Grain with The GIMP, Apr. 20, 2004, http://web.archive.org/web/20040420183648/http://gimpguru.org/Tutorials/FilmGrain/.*

(Continued)

*Primary Examiner*—Vikkram Bali
*Assistant Examiner*—Michelle Entezari
(74) *Attorney, Agent, or Firm*—Robert D. Shedd; Robert B. Levy

(57) ABSTRACT

Reduction in the blockiness of a simulated film grain block can be achieved either by the use of adaptive downscaling or adaptive deblocking filtering to adjust the intensity of the pixels at the block edge in accordance with at least one film grain block parameter, such as film grain size, intensity and texture. Performing such adaptive downscaling or adaptive deblocking filtering achieves improved performance at lower computational cost by avoiding modification of film grain block pixels in lesser affected areas.

22 Claims, 5 Drawing Sheets

U.S. PATENT DOCUMENTS

Figure 1:
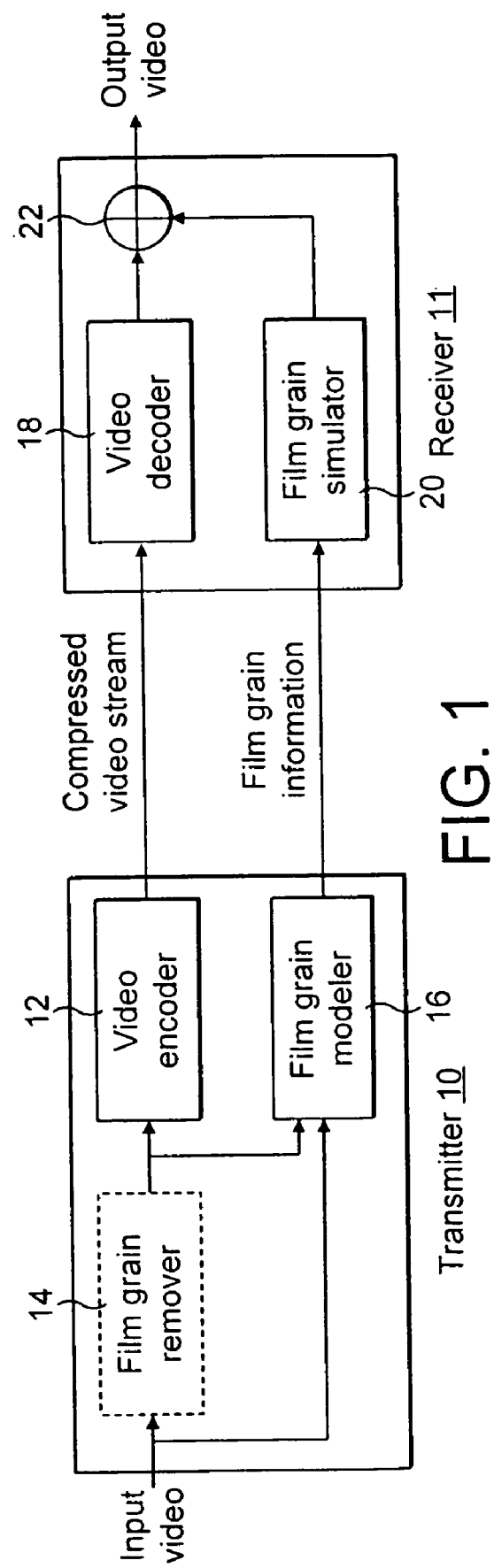

| | | | |
|---|---|---|---|
| 4,998,167 A * | 3/1991 | Jaqua | 348/443 |
| 5,140,414 A | 8/1992 | Mowry | |
| 5,335,013 A | 8/1994 | Faber | |
| 5,374,954 A | 12/1994 | Mowry | |
| 5,406,326 A | 4/1995 | Mowry | |
| 5,457,491 A | 10/1995 | Mowry | |
| 5,471,572 A | 11/1995 | Buchner et al. | |
| 5,475,425 A * | 12/1995 | Przyborski et al. | 348/239 |
| 5,629,769 A | 5/1997 | Cookingham et al. | |
| 5,641,596 A | 6/1997 | Gray et al. | |
| 5,687,011 A | 11/1997 | Mowry | |
| 5,709,972 A | 1/1998 | Cookingham et al. | |
| 5,767,860 A | 6/1998 | Zimmer et al. | |
| 5,831,673 A * | 11/1998 | Przyborski et al. | 348/239 |
| 6,269,180 B1 * | 7/2001 | Sevigny | 382/162 |
| 6,667,815 B1 * | 12/2003 | Nagao | 358/1.9 |
| 6,724,942 B1 * | 4/2004 | Arai | 382/254 |
| 6,728,317 B1 * | 4/2004 | Demos | 375/240.21 |
| 6,990,252 B2 * | 1/2006 | Shekter | 382/276 |
| 7,630,005 B2 * | 12/2009 | Takei | 348/239 |
| 7,664,337 B2 * | 2/2010 | Balram et al. | 382/268 |
| 2002/0034337 A1 | 3/2002 | Shekter | |
| 2002/0106103 A1 * | 8/2002 | Jones et al. | 382/100 |
| 2003/0086623 A1 * | 5/2003 | Berkner et al. | 382/260 |
| 2004/0071363 A1 * | 4/2004 | Kouri et al. | 382/276 |
| 2004/0101059 A1 * | 5/2004 | Joch et al. | 375/240.29 |
| 2004/0208389 A1 * | 10/2004 | Lin | 382/260 |
| 2004/0264795 A1 * | 12/2004 | Fielding | 382/254 |
| 2006/0115175 A1 * | 6/2006 | Cooper et al. | 382/260 |
| 2006/0133686 A1 * | 6/2006 | Gomila et al. | 382/254 |
| 2006/0215767 A1 * | 9/2006 | Gomila et al. | 375/240.25 |
| 2007/0030996 A1 * | 2/2007 | Winger et al. | 382/100 |
| 2007/0036452 A1 * | 2/2007 | Llach et al. | 382/254 |
| 2007/0058878 A1 * | 3/2007 | Gomilla et al. | 382/254 |
| 2007/0070241 A1 * | 3/2007 | Boyce et al. | 348/441 |
| 2007/0104380 A1 * | 5/2007 | Gomila et al. | 382/239 |
| 2007/0140588 A1 * | 6/2007 | Balram et al. | 382/275 |
| 2007/0269125 A1 * | 11/2007 | Llach et al. | 382/254 |
| 2008/0152250 A1 * | 6/2008 | Gomila et al. | 382/260 |

FOREIGN PATENT DOCUMENTS

| | | |
|---|---|---|
| EP | 1175091 | 1/2002 |
| EP | 1215624 | 6/2002 |
| WO | WO9314591 | 7/1993 |
| WO | WO9520292 | 7/1995 |
| WO | WO9710676 | 3/1997 |
| WO | WO9722204 | 6/1997 |
| WO | WO0146992 | 6/2001 |
| WO | WO0177871 | 10/2001 |
| WO | WO2004104931 | 12/2004 |

OTHER PUBLICATIONS

Campisi, P, et al. "Signal-dependent film grain noise generation using homomorphic adaptive filtering.", IEE Proceedings Vision, Image and Signal Processing, vol. 147, No. 3 pp. 283-287 Jun. 2000.

McLean, I, et al., "Telecine Noise Reduction", IEE Seminar Digital Restoration of Film and Video Archives (Ref. No. 01/049), IEE Seminar Digital Restoration of Film and Video Archives, London, UK. Jan. 16, 2001, pp. 2/1-2/6.

Al-Shaykh, Osama K., et al., "Restoration of Lossy Compressed Noisy Images", IEEE Transactions of Image Processing, vol. 8. No. 10, pp. 1348-1360, Oct. 1999.

Yan, Jacky Chun Kit, et al. "Signal Dependent Film Grain Noise Removal and Generation Based on Higher-Order Statistics", 1997 IEEE Signal Processing Workshop on Higher-Order Statistics, Jul. 21-23, Banff, Alberta, Canada. pp. 77-81.

Al-Shaykh, Osama K, et al. "Lossy Compression of Images Corrupted by Film Grain Noise", Proceedings International Conference on Image Processing, Sep. 16-19, 1996, Lausanne, Switzerland vol. I of III, pp. 805-808.

Prades-Nebot, Josep, et al., "Rate Control for Fully Fine Grained Scalable Video Coders", Proceedings of SPIE, vol. 4671, pp. 828-839, 2002.

Gomila, Cristina, et al., "SEI Message for Film Grain Encoding", Joint Video Team(JVT) of ISO/IEC MPEG & ITU-T VCEG(ISO/IEC JTC1/SC29/WG11 and ITU-T SG16 Q.6) $8^{th}$ Meeting, Geneva, CH May 23-27, 2003 pp. 1-14.

Sullivan, Gary, et al., "Draft Text of H.264/AVC Professional Extensions Amendment", Joint Video Team(JVT) of ISO/IEC MPEG & ITU-T VCEG(ISO/IEC JTC1/SC29/WG11 and ITU-T SG16 Q.6) 10th Meeting, Waikoloa Hawaii Dec. 8-12, 2003 pp. i-55.

Van Der Schaar, M., et al., "Fine-Granularity for Wireless Video and Scalable Storage", Proceedings of SPIE vol. 4671, pp. 805-816, 2002.

Yan, Jacky Chun Kit, et al. "Film Grain Noise Removal and Generation for Color Images", 1997 IEEE Signal Processing Workshop on Higher-Order Statistics, Jul. 21-23, Banff, Alberta, Canada. pp. 73-76.

Yan, Rong, et al., "Efficient Video Coding with Hybrid Spatial and Fine Grain SNR Scalabilities", Proceedings of SPIE vol. 4671, pp. 850-859, 2002.

Yoshida, J, "Go with the Grain, Film R&D Chief Urges, for Art's Sake", EETimes, http://www.eetimes.com/showArticle.jhtml?articleID=59301182 (last checked Jul. 23, 2007).

Zhang, Xi Min, et al., "Constant Quality Constrained Rate Allocation for FGS Video Coded Bitstreams", Proceedings of SPIE, vol. 4671, pp. 817-827, 2002.

Chavel, P., et al., "Film Grain Noise in Partially Coherent Imaging", Optical Engineering, vol. 19, No. 3, May/Jun. 1980, pp. 404-410.

Brightwell, PJ, et al., "Automated Correction of Film Unsteadiness, Dirt and Grain", International Broadcasting Convention, Sep. 16-20, 1994 Conference Publication, No. 397.

Al-Shaykh, Osama K, et al., "Lossy Compression of Noisy Images", IEEE Transactions on Image Processing vol. 7, No. 12, Dec. 1998, pp. 1641-1652.

Fischer, Marco, et al., "Image Sharpening Using Permutation Weighted Medians", Dept of Electrical Engineering, University of Delware Newark, DE, pp. 1-4.

Zhao, Lifeng, et al., "Constant Quality Rate Control for Streaming MPEG-4 FGS Video", IEEE, 2002, pp. 544-547.

Shahnaz, Rubeena, et al., "Image Compression in Signal-Dependent Noise", Applied Optics, vol. 38, No. 26, Sep. $10^{th}$ 1999, pp. 5560-5567.

Oktem, R, et al., "Transform Domain Algorithm for Reducing Effect of Film Grain Noise in Image Compression", Electronics Letters, vol. 35, No. 21, Oct. 14, 1999, pp. 1830-1831.

Peng, Sharon, et al., Adaptive Frequency Weighting for Fine-Granularity-Scalability, Proceedings of SPIE, vol. 4671, pp. 840-849, 2002.

List, Peter, et al., "Adaptive Deblocking Filter", IEEE Transactions of Circuits and Systems for Video Technology, vol. 13, No. 7, Jul. 2003, pp. 614-619.

U.S. Appl. No. 10/569,318, filed Aug. 15, 2008, Office action in related case.

U.S. Appl. No. 10/569,318, filed Feb. 13, 2009, Office action in related case.

U.S. Appl. No. 10/556,834, filed Aug. 19, 2008, Office action in related case.

U.S. Appl. No. 10/556,834, filed Feb. 20, 2009, Office action in related case.

Office Action from U.S. Appl. No. 10/556,834 mailed Aug. 19, 2008.
Office Action from U.S. Appl. No. 10/556,834 mailed Feb. 20, 2009.
Notice of Non-Compliant Amendment from U.S. Appl. No. 10/556,834 mailed Jun. 16, 2009.
Office Action from U.S. Appl. No. 10/569,318 mailed Aug. 15, 2008.
Office Action from U.S. Appl. No. 10/569,318 mailed Feb. 13, 2009.
Office Action from U.S. Appl. No. 10/569,318 mailed Jul. 31, 2009.
Office Action from U.S. Appl. No. 10/572,820 mailed Jun. 1, 2009.
Office Action from U.S. Appl. No. 10/571,148 mailed Apr. 15, 2009.
Office Action from U.S. Appl. No. 10/575,676 mailed Dec. 15, 2008.
Office Action from U.S. Appl. No. 10/575,676 mailed Mar. 13, 2009.
Office Action from U.S. Appl. No. 11/246,848 mailed Jun. 26, 2009.

* cited by examiner

Block m

Block m

TECHNIQUE FOR ADAPTIVE DE-BLOCKING OF BLOCK-BASED FILM GRAIN PATTERNS

CROSS-REFERENCE TO RELATED APPLICATIONS

This application claims priority under 35 U.S.C. 119(e) to U.S. Provisional Patent Application Ser. No. 60/620,702, filed Oct. 21, 2004, the teachings of which are incorporated herein.

TECHNICAL FIELD

This invention relates to a technique for filtering simulated film grain.

BACKGROUND OF THE INVENTION

Motion picture films comprise silver-halide crystals dispersed in an emulsion, coated in thin layers on a film base. The exposure and development of these crystals form the photographic image consisting of discrete tiny particles of silver. In color negatives, the silver undergoes chemical removal after development and tiny blobs of dye occur on the sites where the silver crystals form. These small specks of dye are commonly called 'grain' in color film. Grain appears randomly distributed on the resulting image because of the random formation of silver crystals on the original emulsion. Within a uniformly exposed area, some crystals develop after exposure while others do not.

Grain varies in sizes and shapes. The faster the film (i.e., the greater the light sensitivity), the larger the clumps of silver formed and blobs of dye generated, and the more they tend to group together in random patterns. The grain pattern is typically known as 'granularity'. The naked eye cannot distinguish individual grains, which vary from 0.0002 mm to about 0.002 mm. Instead, the eye resolves groups of grains, referred to as blobs. A viewer identifies these groups of blobs as film grain. As the image resolution becomes larger, the perception of the film grain becomes higher. Film grain becomes clearly noticeable in cinema and high-definition images, whereas film grain progressively loses importance in SDTV and becomes imperceptible in smaller formats.

Motion picture film typically contains image-dependent noise resulting either from the physical process of exposure and development of the photographic film or from the subsequent editing of the images. The photographic film possesses a characteristic quasi-random pattern, or texture, resulting from physical granularity of the photographic emulsion. Alternatively, a similar pattern can be simulated over computed-generated images in order to blend them with photographic film. In both cases, this image-dependent noise is referred to as grain. Quite often, moderate grain texture presents a desirable feature in motion pictures. In some instances, the film grain provides visual cues that facilitate the correct perception of two-dimensional pictures. Film grain is often varied within a single film to provide various clues as to time reference, point of view, etc. Many other technical and artistic uses exist for controlling grain texture in the motion picture industry. Therefore, preserving the grainy appearance of images throughout image processing and delivery chain has become a requirement in the motion picture industry.

Several commercially available products have the capability of simulating film grain, often for blending a computer-generated object into a natural scene. Cineon® from Eastman Kodak Co, Rochester N.Y., one of the first digital film applications to implement grain simulation, produces very realistic results for many grain types. However, the Cineon® application does not yield good performance for many high-speed films because of the noticeable diagonal stripes the application produces for high grain size settings. Further, the Cineon® application fails to simulate grain with adequate fidelity when images are subject to previous processing, for example, such as when the images are copied or digitally processed.

Another commercial product that simulates film grain is Grain Surgery™ from Visual Infinity Inc., which is used as a plug-in of Adobe® After Effects®. The Grain Surgery™ product appears to generate synthetic grain by filtering a set of random numbers. This approach suffers from disadvantage of a high computational complexity.

None of these past schemes solves the problem of restoring film-grain in compressed video. Film grain constitutes a high frequency quasi-random phenomenon that typically cannot undergo compression using conventional spatial and temporal methods that take advantage of redundancies in the video sequences. Attempts to process film-originated images using MPEG-2 or ITU-T Rec. H.264|ISO/IEC 14496-10 compression techniques usually either result in an unacceptably low degree of compression or complete loss of the grain texture.

As a result of work done by applicants; there now exist techniques for simulating grain by combining multiple blocks of film grain samples for subsequent addition to an image. These techniques create each block independently of the others. When combining such blocks of film grain, artifacts can occur. One previous technique for reducing artifacts mandates diminishing the intensity of the simulated grain along the edges of each block. Diminishing the intensity affords ease of implementation at the expense of reduced grain quality. Applying a deblocking filter to each film grain block constitutes another approach to reducing artifacts. While applying a deblocking filter has a lesser impact on the quality of the grain, implementing such a filter increases computational complexity.

Thus, there is need for a technique for deblocking film grain blocks, which achieves better quality (i.e., reduced artifacts) while maintaining a low computational cost.

BRIEF SUMMARY OF THE INVENTION

Briefly, in accordance with the present principles, there is provided a method for deblocking the at least one film grain block. The method commences by first establishing the at least the at least one parameter associated with characteristic of the film grain in the block. Thereafter the film grain blockiness, that is the appearance of the film grain as separate blocks, rather than a seamless image, is reduced in accordance with the at least one parameter.

DETAILED DESCRIPTION OF THE DRAWINGS

Figure 2:
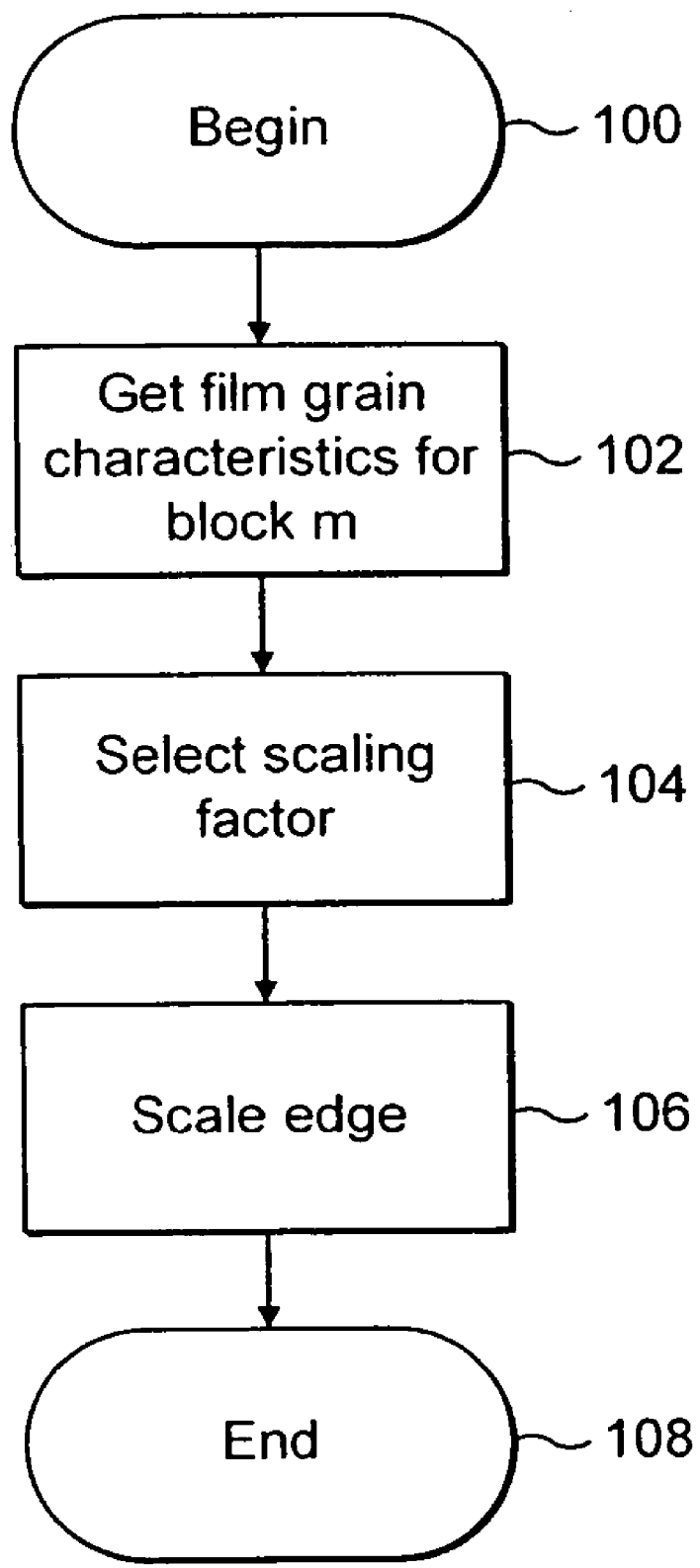
Figure 3A:
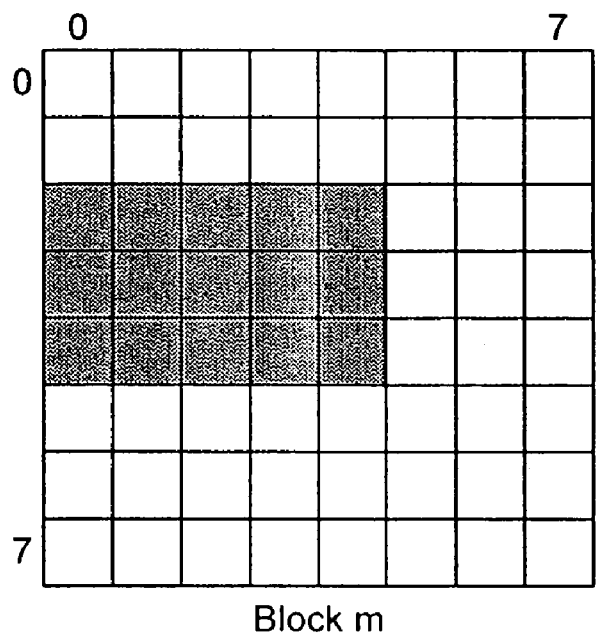
Figure 3B:
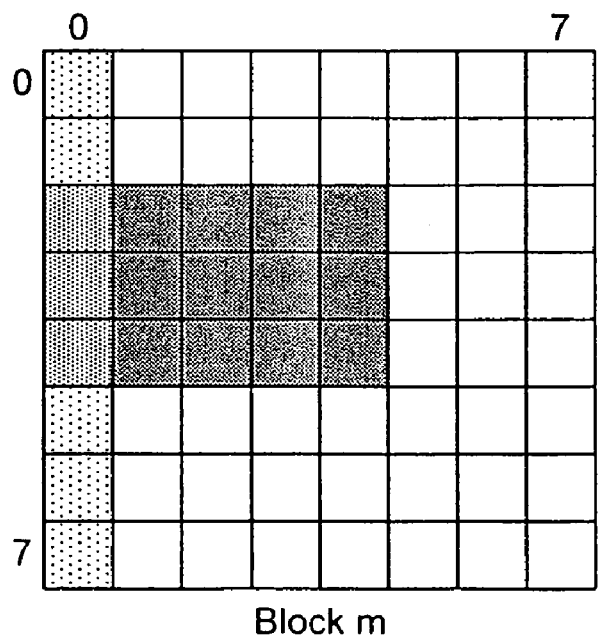
Figure 4:
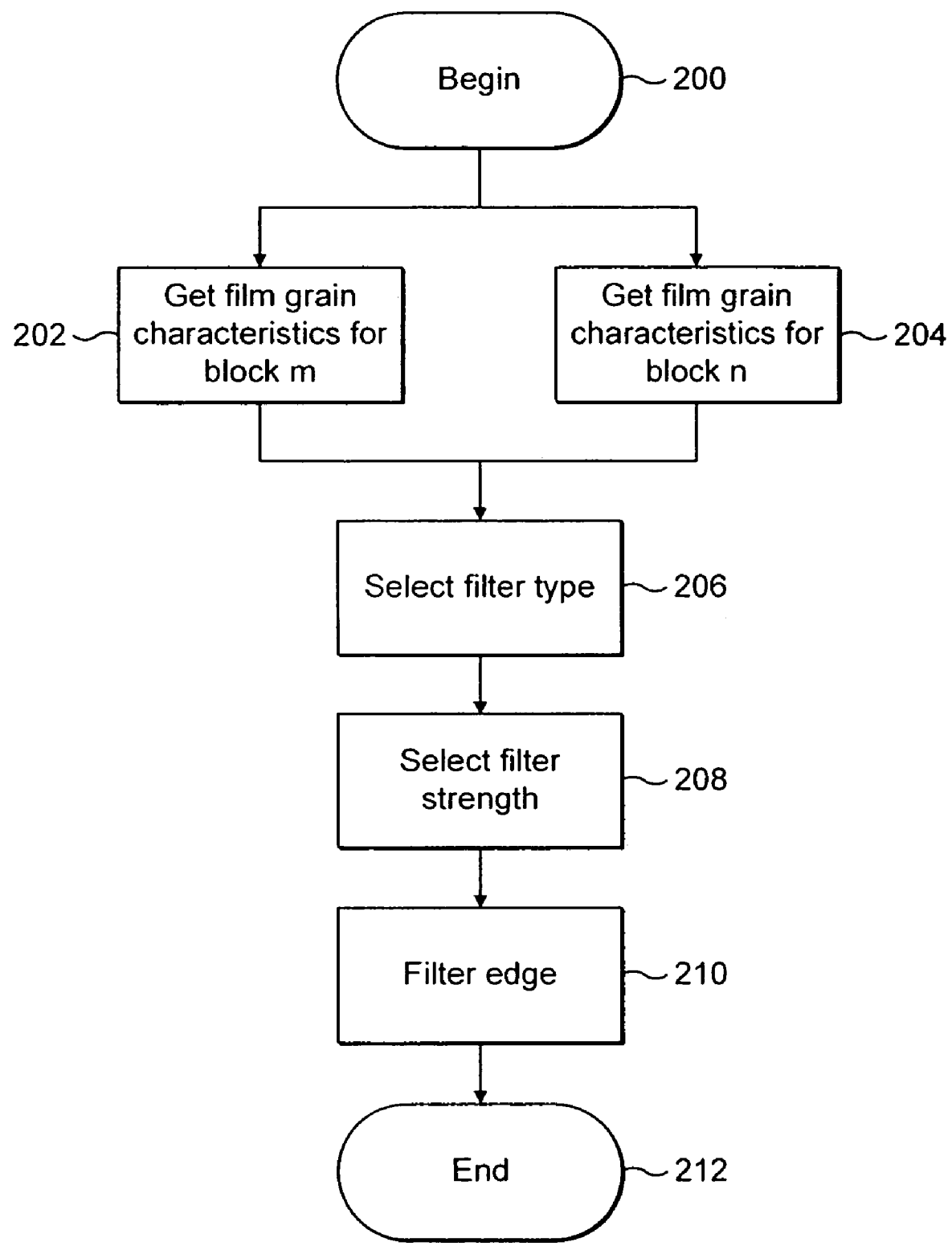
Figure 5A:
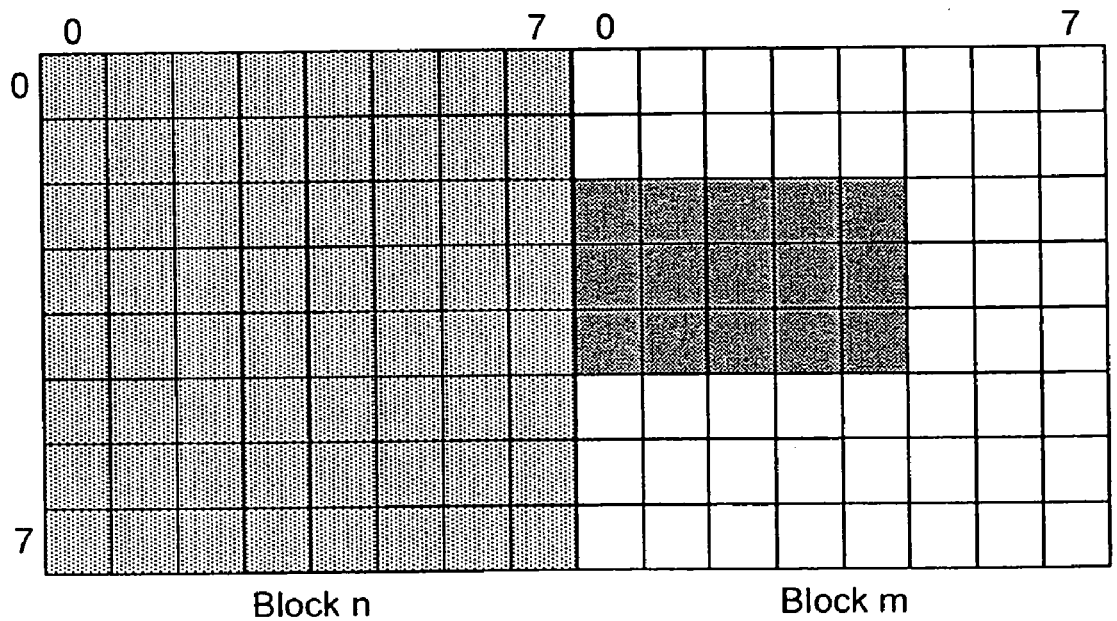
Figure 5B:
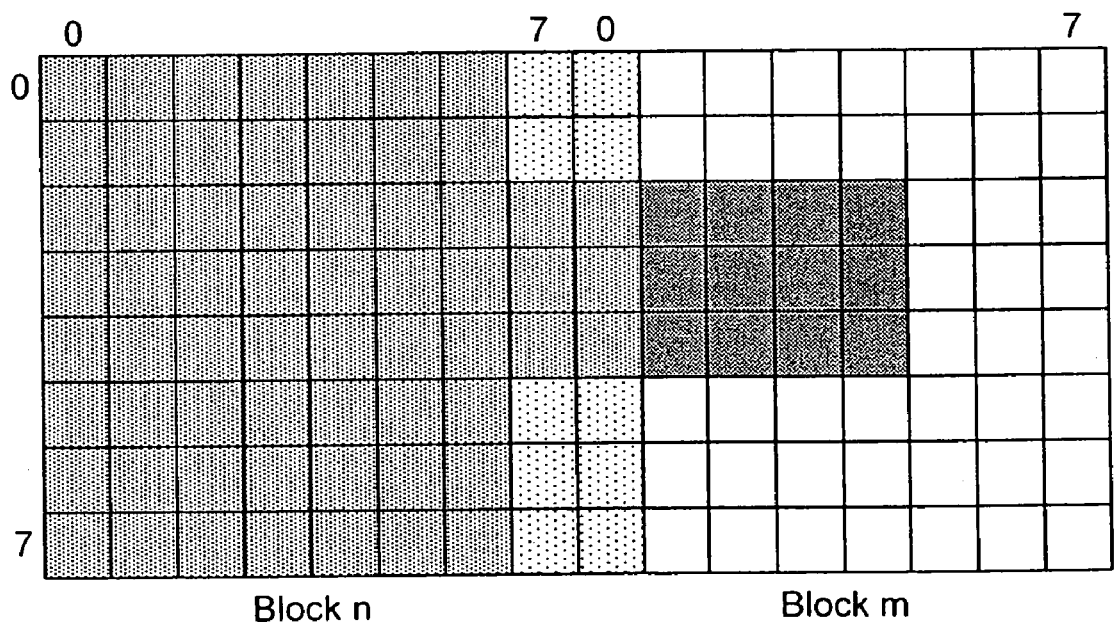

FIG. 1 depicts a block schematic diagram of the combination of a transmitter and receiver in a film grain processing chain useful for practicing the technique of the present principles;

FIG. $2_{[JL1]}$ illustrates in flow chart form a method for reducing film grain blockiness by downscaling of block edges in accordance with a first illustrative embodiment of the present principles;

FIGS. 3A and 3B illustrate film grain blocks before and after downscaling of the block edges in accordance with the method of FIG. 2;

FIG. $4_{[JL2]}$ illustrates in flow chart form a method for reducing film grain blockiness by adaptive deblocking in accordance with a second illustrative embodiment of the present principles; and FIGS. 5A and 5B illustrate adjacent pairs of film grain blocks before and after deblocking filtering in accordance with the method of FIG. 4.

DETAILED DESCRIPTION

To understand the technique of the present principles for deblocking simulated film grain, a brief overview of film grain simulation will prove helpful. FIG. 1 depicts a block schematic diagram of a transmitter 10, which receives an input video signal and, in turn, generates a compressed video stream at its output. In addition, the transmitter 10 also generates information indicative of the film grain (if any) present in the sample. In practice, the transmitter 10 could comprises part of a head-end array of a cable television system, or other such system that distributes compressed video to one or more downstream receivers 11, only one of which is shown in FIG. 1. The transmitter 10 could also take the form of encoder that presents media like DVDs. The receiver 11 decodes the coded video stream and simulates film grain in accordance with the film grain information and decoded video, both received from the transmitter 10 or directly from the media itself in the case of a DVD or the like, to yield an output video stream that has simulated film grain. The receiver 11 can take the form of a set-top box or other such mechanism that serves to decode compressed video and simulate film grain in that video.

The overall management of film grain requires the transmitter 10 (i.e., the encoder) provide information with respect to the film grain in the incoming video. In other words, the transmitter 10 "models" the film grain. Further the receiver 11 (i.e., decoder) simulates the film grain according to the film grain information received from the transmitter 10. The transmitter 10 enhances the quality of the compressed video by enabling the receiver 11 to simulate film grain in the video signal when difficulty exists in retaining the film grain during the video coding process.

In the illustrated embodiment of FIG. 1, the transmitter 10 includes a video encoder 12 which encodes the incoming video stream using any of the well known video compression techniques such as the ITU-T Rec. H.264|ISO/IEC 14496-10 video compression standard. Optionally, a film grain remover 14, in the form of a filter or the like depicted in dashed lines in FIG. 1, could exist upstream of the encoder 12 to remove any film grain in the incoming video stream prior to encoding. To the extent that the incoming video contains little if any film grain, no need would exist for the film grain remover 14.

A film grain modeler 16 accepts the input video stream, as well as the output signal of the film grain remover 14 (when present). Using such input information, the film grain modeler 16 establishes the film grain in the incoming video signal. In its simplest form, the film grain modeler 16 could comprise a look up table containing film grain models for different film stocks. Information in the incoming video signal would specify the particular film stock originally used to record the image prior to conversion into a video signal, thus allowing the film grain modeler 16 to select the appropriate film grain model for such film stock. Alternatively, the film grain modeler 16 could comprise a processor or dedicated logic circuit that would execute one or more algorithms to sample the incoming video and determine the film grain pattern that is present.

The receiver 11 typically includes a video decoder 18 that serves to decode the compressed video stream received from the transmitter 10. The structure of the decoder 18 will depend on the type of compression performed by the encoder 12 within the transmitter 10. Thus, for example, the use within the transmitter 10 of an encoder 12 that employs the ITU-T Rec. H.264|ISO/IEC 14496-10 video compression standard to compress outgoing video will dictate the need for an H.264-compliant decoder 18. Within the receiver 11, a film grain simulator 20 receives the film grain information from the film grain model 16. The film grain simulator 20 can take the form of a programmed processor, or dedicated logic circuit having the capability of simulating film grain for combination via a combiner 22 with the decoded video stream.

Film grain simulation aims to synthesize film grain samples that simulate the look of the original film content. As described, film grain modeling occurs at the transmitter 10 of FIG. 1, whereas film grain simulation occurs at the receiver 11. In particular, film grain simulation occurs in the receiver 11 along with the decoding the incoming video stream from the transmitter 10 upstream of the output of the decoded video stream. Note that the decoding process that occurs in the receiver 11 makes no use of images with added film grain. Rather, film grain simulation constitutes a post-processing method for synthesizing simulated film grain in the decoded images for display. For that reason, the ITU-T Rec. H.264|ISO/IEC 14496-10 video compression standard contains no specifications regarding the film grain simulation process. However, film grain simulation requires information concerning the grain pattern in the incoming video signal, which information typically undergoes transmission in a Supplemental Enhancement Information (SEI) message when using the ITU-T Rec. H.264|ISO/IEC 14496-10 video compression standard as specified by the Amendment 1 (Fidelity Range Extensions) of that compression standard.

The film grain simulator 20 can simulate film grain in different ways. For example, the film grain simulator 20 could simulate film grain by making use of a database (e.g. a look-up table or LUT) containing a plurality of pre-computed blocks of film grain for addition to the image. A typical method for pre-computing the film grain blocks in the database would make use of a Gaussian pseudorandom number generator (not shown). Alternatively, the film grain simulator 20 could calculate each film block as needed, typically making use of a Gaussian pseudorandom number generator for this purpose.

Film grain simulation by combining multiple individual film grain blocks in the manner just described can lead to artifacts, and in particular, a condition known as blockiness whereby the blocks of film grain appear separately, rather than merging in a seamless manner. One previous technique for reducing blockiness includes the step of diminishing the intensity of the simulated grain along the edges of each block. Another prior art technique applies a deblocking filter to each film grain block. Both of these prior approaches incur disadvantage as described below.

Downscaling Pixel Values at Block Edges by the Prior Art

One past approach to reducing blockiness relied on scaling down the film grain samples on the edge of each block. Previously, such downscaling of the top and bottom edge of each film grain block occurred by dividing by two the value of the film grain samples as follows:

$$\text{for } i = 0, \ldots, N-1$$
$$block_m[i][0] \gg = 1$$
$$block_m[i][N-1] \gg = 1$$

where N is the block size (square in the example), and $block_m[x][y]$ is the film grain sample at position (x,y) of block m.

Downscaling in this manner provides the desired attenuation since film grain samples have null average and lie equally distributed between positive and negative values. The scaling of left and right edges can occur in a similar manner:

for $j = 0, \ldots, N-1$ $\quad block_m[0][j] \gg\ = 1$ $\quad block_m[N-1][j] \gg\ = 1$ This approach incurs the disadvantage of modifying a significant percentage of the N×N film grain blocks without taking into account the film grain characteristics. For 8×8 film grain blocks, for example, when all four edges undergo scaling, almost half of the samples will have their intensity diminished, whereas when only vertical (or horizontal) edges undergo scaling, a quarter of the samples become affected. For 16×16 film grain blocks, a forth and an eighth of the samples become affected, respectively. In general, the larger the block the smaller the percentage of scaled film grain samples, however, block sizes over 16×16 typically prove too large to be usable in consumer products.

Improved Downscaling Technique

In accordance with the present principles, improved artifact reduction can occur by varying the strength of the downscaling factor applied to the edges of each film grain block in accordance with the at least one characteristic of the film grain within the block. FIG. 2 illustrates in flow chart form the steps for accomplishing such film grain block edge downscaling. In the illustrative embodiment of FIG. 2, the size of the film grain within the block serves as the parameter that controls the intensity of the edge scaling, In particular, the intensity of the edge scaling will vary proportionally to the size of the grain within the block. One or more other characteristics of the film grain block could serve to influence the intensity of the edge scaling in addition to or in place of the film grain size.

The method of FIG. 2 commences upon execution of the begin step (step 100) during which system initialization occurs although such initialization need not necessarily happen under all circumstances. Following step 100, step 102 occurs, initiating acquisition of the at least one characteristic of the film grain block that controls the edge scaling. As discussed above, in the illustrative embodiment, the film grain size serves as the characteristic that controls edge scaling. Typically, film grain size serves as a good characteristic for controlling edge scaling because the blockiness resulting from mosaicing blocks of film grain to create a seamless image become less visible for smaller grain sizes as fewer shapes become affected by the edge. Typically, the film grain size constitutes one of the parameters regarding film grain carried in the SEI message received by the receiver 11 that undertakes both simulation, as well as blockiness reduction in the manner described hereinafter.

Following step 102, step 104 occurs, initiating selection of a scaling factor for downscaling the edges. To best understanding the scaling factor selection process, assume that $s_h(m)$ constitutes the parameter that represents the horizontal size of the grain for block m, and $s_v(m)$ constitutes the parameter that represents the vertical size of the grain for block m. Then, the scaling of horizontal (top and bottom) edges can be formulated as:

for $i = 0, \ldots, N-1$ $\quad block_m[i][0] \mathrel{*}= \mathrm{scale\_factor}_v[s_v(m)]$ $\quad block_m[i][N-1] \mathrel{*}= \mathrm{scale\_factor}_v[s_v(m)]$ where $\mathrm{scale\_factor}_v[s]$ comes from a look-up table (LUT) (not shown) which provides the scaling factor for each vertical film grain size allowed by the film grain simulation process. Analogously, the scaling of vertical block edges (left and right) can be formulated as:

for $j = 0, \ldots, N-1$ $\quad block_m[0][j] \mathrel{*}= \mathrm{scale\_factor}_h[s_h(m)]$ $\quad block_m[N-1][j] \mathrel{*}= \mathrm{scale\_factor}_h[s_h(m)]$ where $\mathrm{scale\_factor}_h[s]$ comes from a look-up table (LUT) which provides the scaling factor for each horizontal film grain size.

In order to perform all operations using integer arithmetic, the scale factor can be defined as follows:

$\mathrm{scale\_factor}_h[s][0] = \mathrm{intensity}[s]$ $\mathrm{scale\_factor}_h[s][1] = \mathrm{log2\_intensity\_offset}[s]$ Then, a given sample from the film grain $block_m$ can undergo scaling using the following equation:

$block_m[x][y] = (block_m[i][0] * \mathrm{scale\_factor}_v[s_v(m)][0] + (1 \ll (\mathrm{scale\_factor}_v[s_v(m)][1]-1))) \gg \mathrm{scale\_factor}_v[s_v(m)][1]$ Making the scale factor a function of the at least one film grain characteristic achieves higher performance in terms of visual quality. In an illustrative embodiment, the scale factor could be expressed as a function of the grain intensity. In another embodiment, the scale factor could be directly proportional to the film grain size, progressing linearly from the smaller sizes to the larges ones, as represented mathematically by the relationship:

$\mathrm{scale\_factor}[s] = 0.5 + s*0.5/n_s$ where s is in the range $[0, n_s]$, and $n_s$ is the largest film grain.

One possible extension of the above-described method would entail the use of different scaling factors for different rows or columns depending on the characteristics of the current film grain block. Another possible extension would entail taking into account the film grain characteristics for both the current block and the neighboring block (across the edge being scaled) to determine the scaling factors and the number of rows or columns being scaled. Observe that even when taking into account the film grain characteristics from the neighboring block, only the film grain samples of the current block undergo scaling. This helps to maintain a very low computational cost.

In practice, the film grain simulator 20 of FIG. 1 will execute the steps 100 through 108 of FIG. 2. As discussed, the film grain simulator 20 typically takes the form of a programmed processor, a programmable gate array, dedicated logic circuitry or any combination capable or carrying out the method.

FIGS. 3A and 3B depict an exemplary 8×8-pixel film grain block before and after downscaling the left edge of the block in accordance with the technique of the present principles. The film grain block of FIG. 3A has larger sized grain in the region bounded at its upper left and right vertices (0,2) and (4,2) and at its lower left and right vertices (0,4) and (4,4) than elsewhere in the block, with the origin (0,0) at the upper left-hand corner of the block. When downscaling the left-hand edge of the block in accordance with the method of the present principles, the pixels lying along the left-hand edge between the coordinates (0,2) and (0,4) will undergo scaling with a greater intensity than those elsewhere along that edge. Such greater intensity scaling occurs because such pixels lie in the larger size grain in the region within the block.

Deblocking Across Block Edges

As discussed previously, another prior art technique for reducing blockiness involves the application of a deblocking filter across the edges of the film grain block. Such an approach incurs greater computational complexity because of the need to access the at least one pixel per line in each previously computed film grain block. Past deblocking filters have made use of N-tap filters to deblock the vertical edges between adjacent blocks, with the horizontal transitions attenuated with downscaling. Assuming the left edge of an 8×8 $block_m$ lies adjacent to the right edge of an 8×8 $block_n$, deblocking with a N-tap filter with coefficients $(C_{-(N-1)/2}, \ldots, C_0, \ldots, C_{(N-1)/2})$ will occur in accordance with the following relationship:

$$\text{for } j = 0, \ldots, 7$$

$$block_m[0][j] = \frac{\sum_{i=7-((N-1)/2-1)}^{7} C_{6-i} \cdot block_n[i][j] + \sum_{i=0}^{(N-1)/2} C_i \cdot block_m[i][j]}{\sum_{i=-(N-1)/2}^{(N-1)/2} C_i}$$

$$block_n[7][j] = \frac{\sum_{i=7-(N-1)/2}^{7} C_{i-7} \cdot block_n[i][j] + \sum_{i=1}^{(N-1)/2-1} C_i \cdot block_m[i][j]}{\sum_{i=-(N-1)/2}^{(N-1)/2} C_i}$$

with the filter coefficients $C_i$ constituting constant values determined by the choice of the N-tap filter. In particular, the prior art has made use of a 3-tap filter with coefficients (1, 2, 1) for which the above equation yields the following result:

$$\text{for } j = 0, \ldots, 7$$

$$block_m[0][j] =$$
$$(block_n[7][j] + 2 \cdot block_m[0][j] + block_m[1][j])/(1+2+1)$$

$$block_n[7][j] =$$
$$(block_n[6][j] + 2 \cdot block_n[7][j] + block_m[0][j])/(1+2+1)$$

Adaptive Deblocking Filtering in Accordance with the Present Principles

Previous deblocking filters have smoothed all the block transitions with equal strength independently of the film grain patterns within the blocks. This limits performance since experimental results have shown that small patterns create less visual blocking artifacts that the larger ones.

The deblocking technique of the present principles overcomes this drawback by varying the strength of the deblocking filter in accordance with the characteristics of the film grain in a similar way to that described above for the downscaling. FIG. 4 illustrates in flow chart form the steps of a method in accordance with an illustrative embodiment of the present principles for accomplishing adaptive deblocking filtering. The method of FIG. 4 commences upon execution of step 200 during which initialization occurs, although initialization need not necessarily occur. Thereafter, steps 202 and 204 occur to initiate the acquisition of the at least one characteristic of the current film $block_m$ and acquisition of the same characteristic of the immediately prior film grain $block_n$, respectively. The flow chart of FIG. 4 depicts steps 202 and 204 as occurring simultaneously, although the steps could occur in succession.

Step 206 follows steps 202 and 204 during which selection of a filter type occurs. In an illustrative embodiment, the selected filter comprises a 3-tap filter for deblocking of the vertical edges. Such a filter can be formulated in accordance with the following relationship:

$$\text{for } j = 0, \ldots, 7$$

$$block_m[0][j] =$$
$$(C_{-1}[s_{mn}] * [block_n[7][j] + C_0[s_{mn}] * block_m[0][j] + C_1[s_{mn}] *$$
$$block_m[1][j])/(C_{-1}[s_{mn}] + C_0[s_{mn}] + C_1[s_{mn}])$$

$$block_m[0][j] = (C_{-1}[s_{mn}] * [block_n[6][j] + C_0[s_{mn}] * block_m[7][j] +$$
$$C_1[s_{mn}] * block_m[0][j])/(C_{-1}[s_{mn}] + C_0[s_{mn}] + C_1[s_{mn}])$$

where the values of the coefficients $C_{-1}$, $C_0$ and $C_1$ would be obtained through a look-up table (LUT) (not shown) which adapts their value to size of the film grain in both blocks, represented by the parameters $s_{mn}$.

In the illustrated embodiment, the assumption exists that the larger the difference in size between the film grain patterns at both sides of the edges, the stronger the filter. The extension of the above-equation to the case of deblocking horizontal edges is straightforward.

In practice, the film grain simulator 20 of FIG. 1 will execute the steps 200 through 212 of FIG. 2. As discussed, the film grain simulator 20 typically takes the form of a programmed processor, a programmable gate-array dedicated logic circuitry or any combination capable or carrying out the method.

FIG. 5A and 5B depict an exemplary pair of adjacent 8×8-pixel film grain blocks before and after adaptive deblocking filtering in accordance with the technique of the present principles. $Block_n$, the left-hand most block in FIGS. 5A and 5B has a smaller grain size region bounded grain block at its upper left and right vertices (4,3) and (7,3) and at its lower left and right vertices (4,7) and (7,7), than elsewhere in the block, with the origin (0,0) at the upper left-hand corner of the block. $Block_m$, the right-hand most block in FIGS. 5A and 5B has larger sized grain in the region bounded at its upper left and right vertices (0,2) and (4, 2) and at its lower left and right vertices (0, 4) and (4,4) than elsewhere in the block.

As seen in FIG. 5B, following adaptive deblocking in accordance with the technique of the present principles, some of the pixels along the left and right edges of $Block_n$ and $Block_m$, respectively will have different intensities. In particular the pixel located at (7, 2) along the right hand edge of $Block_n$ and the pixel located at (0, 2) along the left hand edge of $Block_m$ each have a greater intensity than the other pixels lying above and below in the same edge of the corresponding block. The greater intensity arises from the adjacency of such pixels to the large grain region in $Block_m$. By the same token, the pixels (5, 7), (6, 7) and (7, 7) lying in the right hand edge of $Block_n$ as well as the pixels (0, 5)(0, 6) and (0, 7) lying in the left hand edge of $Block_m$ all have a smaller intensity following adaptive deblocking filtering. The reduced intensity of these pixels following adaptive deblocking filtering stems from the adjacency of these pixels to the smaller grain size region in Block$_n$.

The adaptive deblocking method of the present principles can readily make use of any other type of deblocking filter where the strength of the filtering depends on one or more parameters in the filter equation. The increase in complexity that results from varying the filter strength remains low since the adaptation can occur using a LUT. Using an LUT obviates the need for extra calculations.

For those applications that can tolerate greater complexity, the method of the present principles can vary the filter strength in accordance with characteristics of the film grain in the block other than, or in addition to, grain size. For example, the adaptive downscaling and adaptive deblocking filtering techniques described with respect to FIGS. 2 and 4, respectively could make use of film grain intensity and/or texture in addition to, or in place of film grain size. In general, both the filter type and strength could vary depending on film grain characteristics. Higher complexity will result from the increase in the number of operations associated with a more complex filter as well as the need for additional memory.

For the most complex and highest performance applications, deblocking filtering in accordance with the present principles can take into account both the characteristics of the film grain and the characteristics of the image that will receive the grain. In an illustrative embodiment, the deblocking strength would vary proportionally to the image brightness, since the film grain (and thus, the transitions between film grain blocks) appear more visible in brighter areas of the image. In another illustrative embodiment, the deblocking strength could vary proportionally to the characteristics of image texture such that the finer the texture, the weaker the deblocking.

As compared to the adaptive downscaling technique described with respect to FIG. 2, the adaptive deblocking filtering technique of FIG. 4 yields better performance since deblocking filtering performs attenuation taking into account pixel values and film grain characteristics at both sides of the block edge. FIGS. 3B and 5B illustrate the difference in performance between the two techniques. By comparing the result on the leftmost column of Block$_m$ resulting from scaling (FIG. 3B) and from deblocking (FIG. 5B), the pixels lying adjacent to the large grain region will take on different values after deblocking, as compared to downscaling due to the influence of the neighboring Block$_n$.

The foregoing describes a technique for reducing blockiness in simulated film grain.

The invention claimed is:

1. A method for reducing blockiness of at least one film grain block for blending with an image, comprising the steps of:
   establishing at least one parameter associated at least in part with a characteristic of film grain in the block, which when blended with an image, simulates motion picture film; and
   reducing the film grain blockiness in accordance with the at least one parameter.

2. The method according to claim 1 wherein the step of reducing the film grain blockiness further comprises the step of downscaling the film grain block along the at least one edge.

3. The method according claim 2 further comprising the step of downscaling the film grain block along all edges.

4. The method according to claim 1 wherein the step of reducing the film grain blockiness further comprises the step of deblocking filtering the film grain block across the at least one edge.

5. The method according to claim 4 wherein the step of reducing the film grain blockiness further comprises the step of deblocking filtering the film grain block across all edges.

6. The method according to claim 1 wherein the step of establishing the at least one parameter further comprises the step of establishing film grain size.

7. The method according to claim 1 wherein the step of establishing the at least one parameter further comprises the step of establishing film grain intensity.

8. The method according to claim 1 wherein the step of establishing the at least one parameter further comprises the step of establishing film grain texture.

9. The method according to claim 1 wherein the step of establishing the at least one parameter further comprises the step of establishing at least one of film grain size, intensity and texture, and establishing at least one image characteristic.

10. The method according to claim 1 further comprising the step of reducing the film grain blockiness differently in different rows in the block.

11. The method according to claim 1 further comprising the step of reducing the film grain blockiness differently in different columns in the block.

12. The method according to claim 1 further comprising the step of reducing the film grain blockiness at least in part in accordance with at least one characteristic of an adjacent block.

13. The method according to claim 1 further comprising the step of reducing the film grain blockiness at least in part in accordance with at least one characteristic of an image receiving the grain.

14. Apparatus for reducing blockiness of at least one film grain block for blending with an image to simulate motion picture film, comprising:
   means for establishing at least one parameter associated with characteristic of the film grain in the block; and
   means for reducing the film grain blockiness in accordance with the at least one parameter.

15. The apparatus according to claim 14 wherein the means for reducing the film grain blockiness further comprises means for downscaling the film grain block along the at least one edge.

16. The apparatus according claim 15 wherein the means for downscaling the film grain block downscales along all block edges.

17. The apparatus according to claim 14 wherein the means for reducing the film grain blockiness further comprises means for deblocking filtering the film grain block across the at least one edge.

18. The apparatus according to claim 17 wherein the deblocking filtering means deblocking filters the film grain block across all edges.

19. The apparatus according to claim 14 wherein the means for establishing the at least one parameter further comprises means for establishing film grain size.

20. The apparatus according to claim 14 wherein the means for establishing at least one parameter further comprises means for establishing film grain intensity.

21. The apparatus according to claim 14 wherein the means for establishing the least one parameter further comprises the means for establishing film grain texture.

22. The apparatus according to claim 14 wherein the means for establishing the least one parameter further comprises means for establishing at least one of film grain size, intensity and texture, and establishing at least one image characteristic.

\* \* \* \* \*